(12) United States Patent
Friedrich

(10) Patent No.: US 9,095,235 B2
(45) Date of Patent: Aug. 4, 2015

(54) CLEANING BASIN FOR BARBECUE GRILL

(76) Inventor: Herbert Friedrich, Gänserndorf (AT)

( * ) Notice: Subject to any disclaimer, the term of this patent is extended or adjusted under 35 U.S.C. 154(b) by 1019 days.

(21) Appl. No.: 12/674,308

(22) PCT Filed: Mar. 26, 2008

(86) PCT No.: PCT/AT2008/000107
§ 371 (c)(1),
(2), (4) Date: Feb. 19, 2010

(87) PCT Pub. No.: WO2009/023882
PCT Pub. Date: Feb. 26, 2009

(65) Prior Publication Data
US 2011/0174342 A1 Jul. 21, 2011

(30) Foreign Application Priority Data
Aug. 22, 2007 (AT) .................................. GM507/2007

(51) Int. Cl.
*A47J 37/07* (2006.01)
*A47L 13/34* (2006.01)
*A47L 17/02* (2006.01)

(52) U.S. Cl.
CPC .......... *A47J 37/0786* (2013.01); *A47J 37/0704* (2013.01); *A47L 13/34* (2013.01); *A47L 17/02* (2013.01)

(58) Field of Classification Search
USPC ............. 134/105, 117, 201, 115 R; 126/25 R
See application file for complete search history.

(56) References Cited

U.S. PATENT DOCUMENTS 3,807,954 A * 4/1974 McDonald .................... 206/210
6,463,945 B1 10/2002 Russell

FOREIGN PATENT DOCUMENTS

| DE | 19605329 A1 | 6/1996 |
| DE | 29906603 U1 | 9/1999 |
| DE | 20309457 U1 | 9/2003 |
| DE | 102005003517 A1 | 8/2006 |
| GB | 2020167 A | 11/1979 |

* cited by examiner

Primary Examiner — David Cormier
(74) Attorney, Agent, or Firm — Laurence A. Greenberg; Werner H. Stemer; Ralph E. Locher

(57) ABSTRACT

Charcoal barbecue grills have a grate (coarse screen) for grilling foods which has generally a size of 430 mm×250 mm or a diameter of 550 mm (in kettle barbecue grills). With these dimensions it is not possible to soak the grate (coarse screen) in the sink of any household kitchen in order to remove residues which accumulate during barbecuing (grease and food remains) because without soaking the grate (coarse screen), it is impossible to completely remove the waste. With the cleaning basin it is possible to clean the dirty grate easily on the barbecue grill. In addition, the residual heat of the grilling coals is used to heat up the wash basin to thus be better able to loosen the impurities. Another advantage of this invention is that the cleaning basin is stored in or on the barbecue grill, thus requiring no separate place. The cleaning basin for rectangular barbecue grills is represented in FIG. 6. The cleaning basin for the round (kettle grill) barbecue grill is represented in FIG. 2.

9 Claims, 9 Drawing Sheets

CLEANING BASIN FOR BARBECUE GRILL

BACKGROUND OF THE INVENTION

Field of the Invention

A cleaning basin (2) is described which receives the grate to be cleaned, said basin being filled with hot water to such an extent that the grate to be cleaned is covered completely. The cleaning basin filled with water is positioned above the barbecue coal, so that the existing residual heat of the coal will further heat the water and thus clean the grate. The cleaning basin is arranged in such a way that it can be stored easily in the kettle grill (3).

The invention relates to the cleaning basin for grates whose water content can be kept hot for a long period of time through the embers in the grill, with brushing of the grate being enabled simultaneously and can be stored as an integrated unit together with the grill.

In order to remove barbecue residues from grates, the following cleaning basins are known: A cleaning basin (special steel) for grate available from Thüros Handels GmbH & Co. KG, Germany, Art. No. RW 4260 E, and grill cleaning basin R 50 and grate cleaning basin (Pro-Idee GmbH & Co. KG, Auf der Hüls 20552053 Aachen, Germany. These known cleaning basins are restricted in their function only to soaking the grill. An additional brushing during the soaking process is not possible through the vertical configuration of the grate cleaning basin of Pro-Idee. Although the grate is easy to access in the cleaning basin (special steel) in grates Art. No. RW 4260, the grate rests on the floor of the cleaning basin, so that brushing of the grate is only possible with difficulty.

In the known cleaning basins, the basins are arranged independent of configuration and type of barbecue grill.

BRIEF SUMMARY OF THE INVENTION

The invention is thus based on the object of preventing a rapid cooling of the supplied hot water and to enable an additional brushing of the grate. The invention further ensures that the cleaning basin can be stored together with the barbecue grill.

This object is achieved by the invention in such a way that the cleaning basin of type "round" or "rectangular" is positioned above the embers and the water to be kept warm is covered.

In the case of the round cleaning basin, it is placed in the kettle grill and positioned above the embers and the cover (3) is placed thereon afterwards. The water thus remains hot for a longer period of time.

In the case of the rectangular cleaning basin, the cleaning basin is placed over the embers with folded receivers (14), depending on the configuration of the barbecue grill. The windbreaker (13) is placed by means of the hinges (25) on the cleaning basin. It is thus ensured that the heat will remain in the cleaning basin. The windbreaker acts as a cover for the cleaning basin. The additional brushing of the barbecue grill which is often mandatory is ensured in the case of the round cleaning basin during the soaking over the embers in such a way that a pressed edge receives the grate in the case of the round cleaning basin and thus does not allow the grate to drop to the floor of the cleaning basin (9). A depression pressed into the floor of the cleaning basin allows brushing the round grate in a vertical manner without the same slipping away (11). In the case of the rectangular cleaning basin, three supports are placed in the basin for the grate (18), so that during the soaking above the embers (FIG. 9) the grate is not able to sink to the floor of the basin. Positioning pins on the cleaning basin prevent the support from slipping away during brushing (19).

The invention fulfils the object of integrating the cleaning basin in a grill in such a way that the cleaning basin is adjusted precisely to the shape of the grill for the kettle grill (4). While the cleaning basin is positioned with its floor in relation to the embers (3) during the soaking process, for storage it is now positioned with the floor upwardly in the direction towards the cover, together with the cleaned grating (4). The grill and the cleaning basin are stored together by placing the cover over them.

The invention fulfils the object of integrating the cleaning basin in a grill for the rectangular grill (8) in such a way that the cleaning basin (17) is larger than the largest diameter of the barbecue coal basin (16). For this purpose, the cleaning basin is positioned with the floor upwardly and thus acts as a cover (17). Since the grill supports have spring clips on the side, they can remain in the cleaning basin (7). Finally, the grate and the supports are placed in the cleaning basin. The cleaning basin is then placed on the grill (8) and is then ready for storage.

Notice must be taken in the arrangement of the cleaning basin that a water quantity must be considered as a filling quantity which is not too large (6.2). This is necessary to ensure a longer heating period. The grate to be cleaned shall be covered at the top with approx. 2 cm of water and at the bottom with approx. 2 cm of water.

BRIEF DESCRIPTION OF THE SEVERAL VIEWS OF THE DRAWING

The drawings of FIGS. 1 to 4 show the subject matter of the invention for a charcoal kettle grill by way of example.

The drawings of FIGS. 5 to 9 show the subject matter of the invention for a rectangular charcoal grill by way of example.

DESCRIPTION OF THE INVENTION

Figure 1:
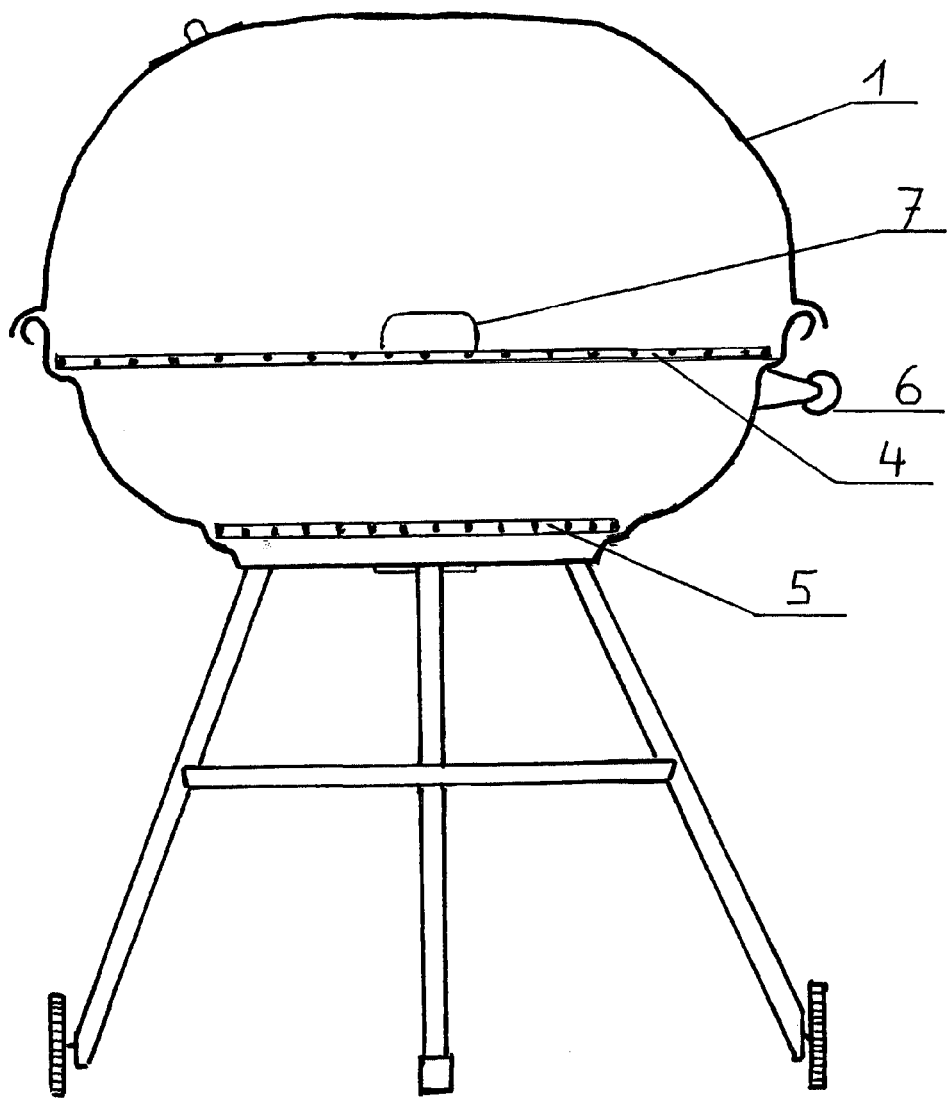
Figure 2:
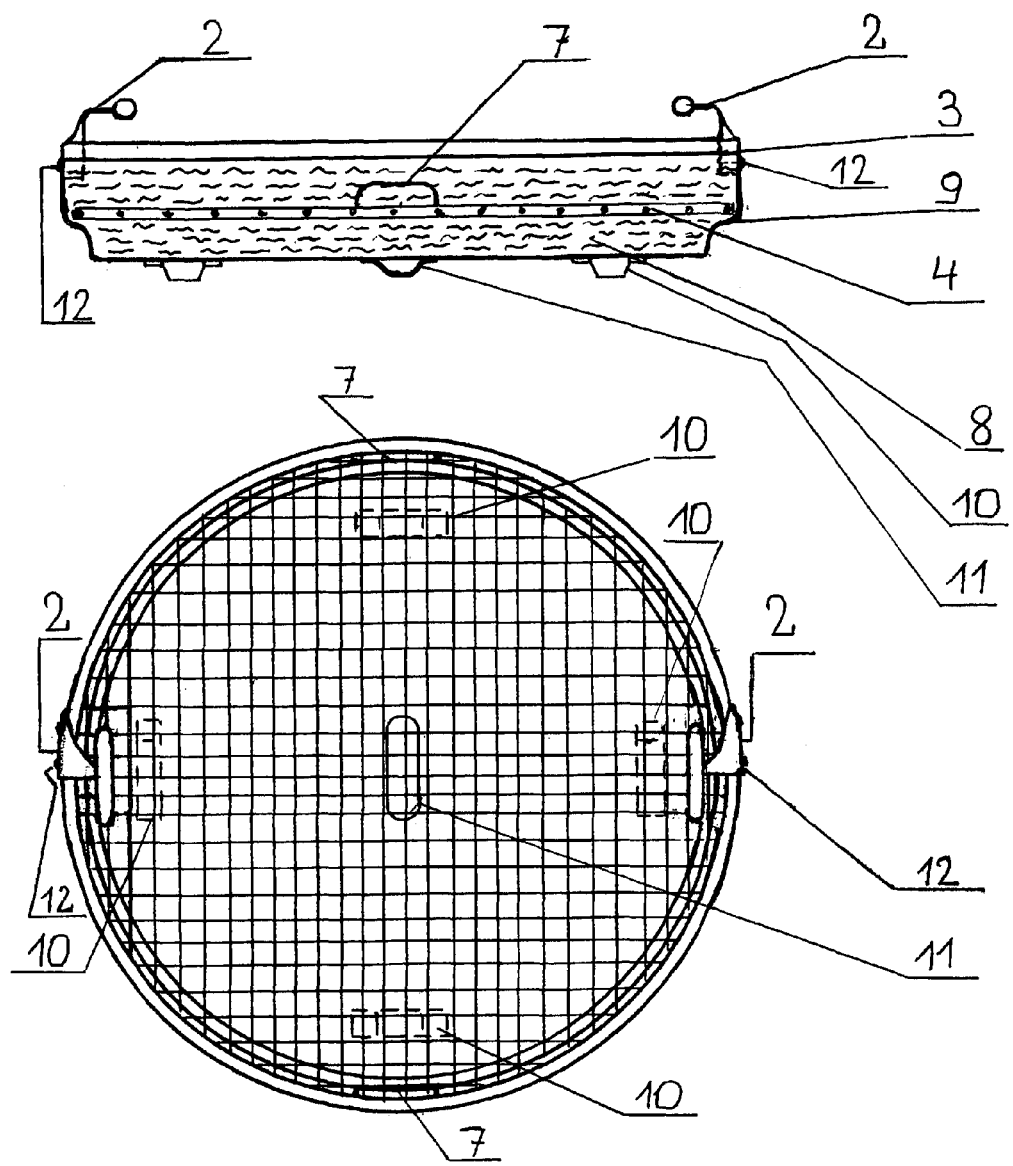
Figure 3:
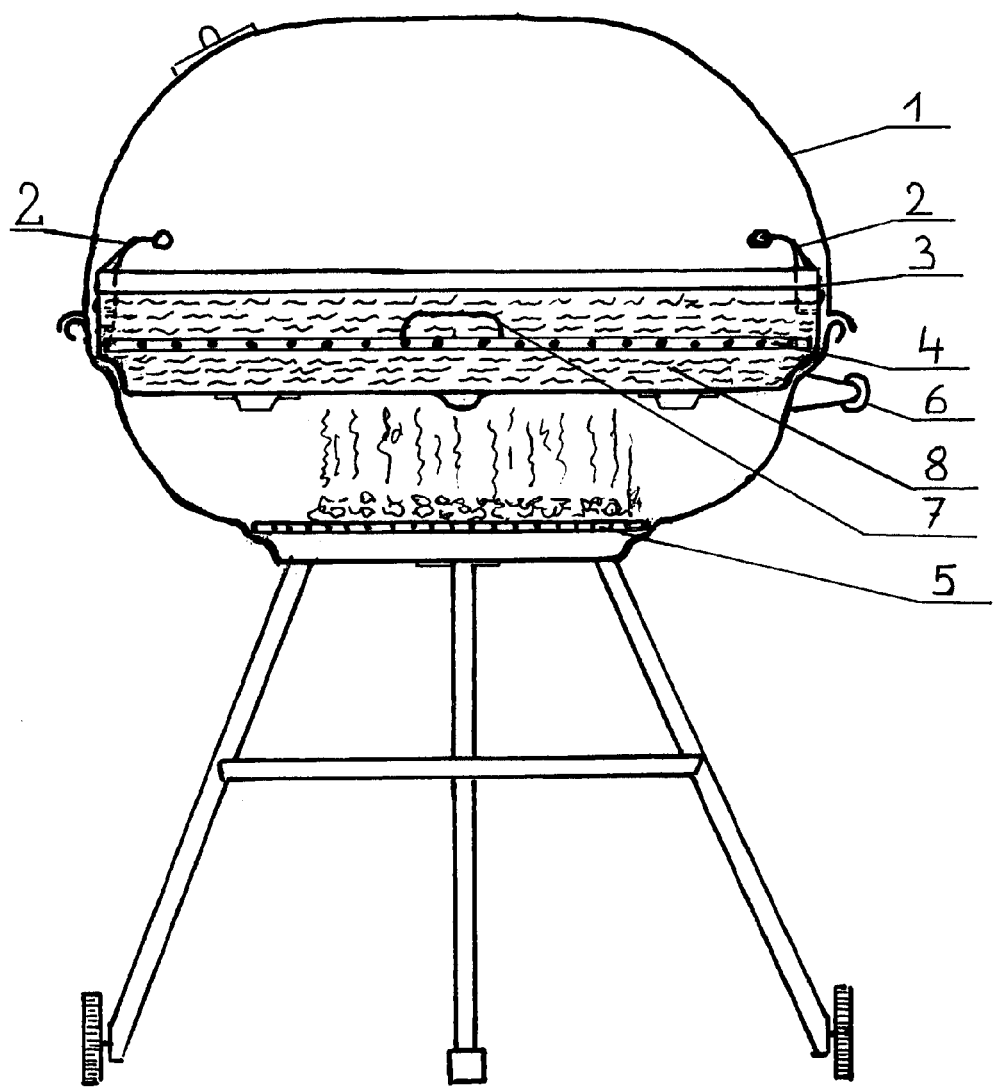
Figure 4:
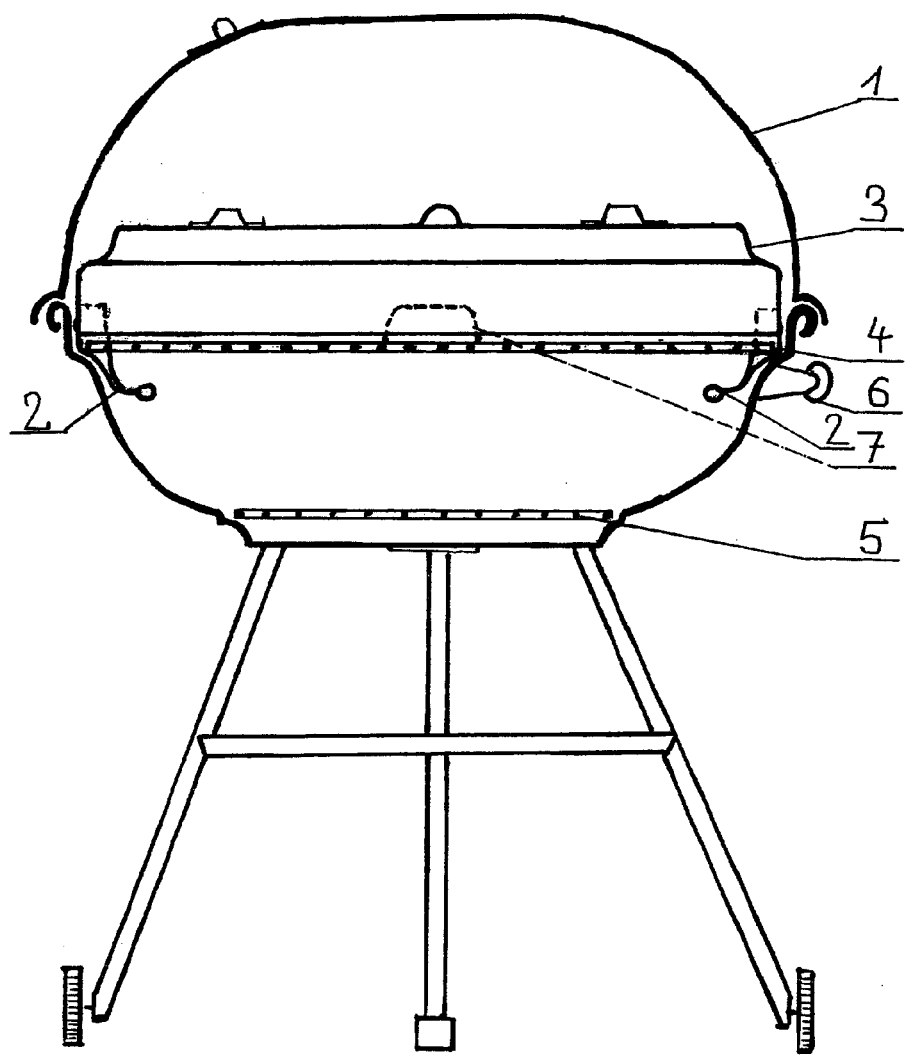
Figure 5:
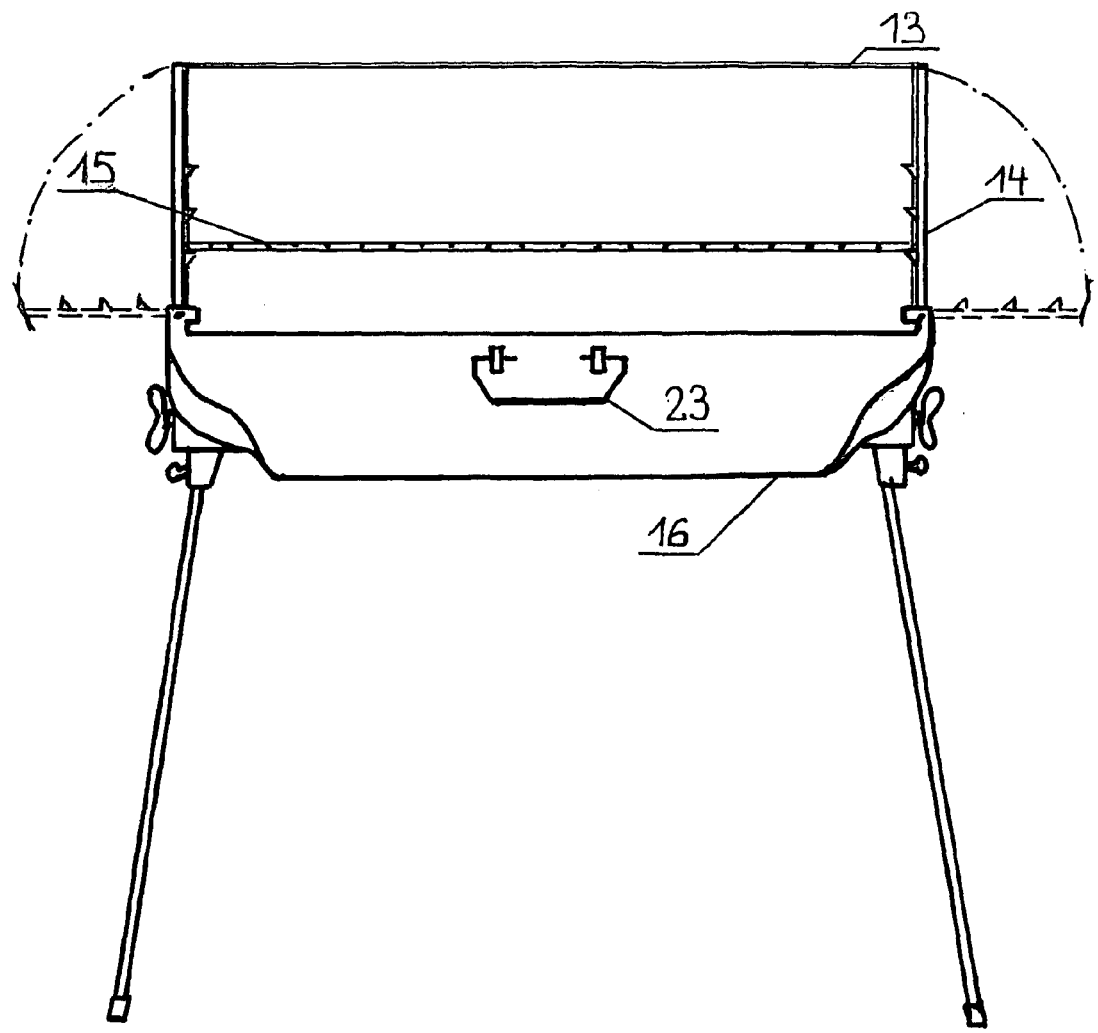

FIG. 2 shows a round cleaning basin (3) with two handles (2) made of steel wire which are twistable by hinges (12) over 180° and the grate (4) which is ready for soaking and which rests on a pressed edge (9), so that the water filling (8) will evenly cover the grate (4) on both sides. An oval depression (11) enables the brushing in the vertical position. Four feet (10) allow positioning the basin in the horizontal state.

Figure 6:
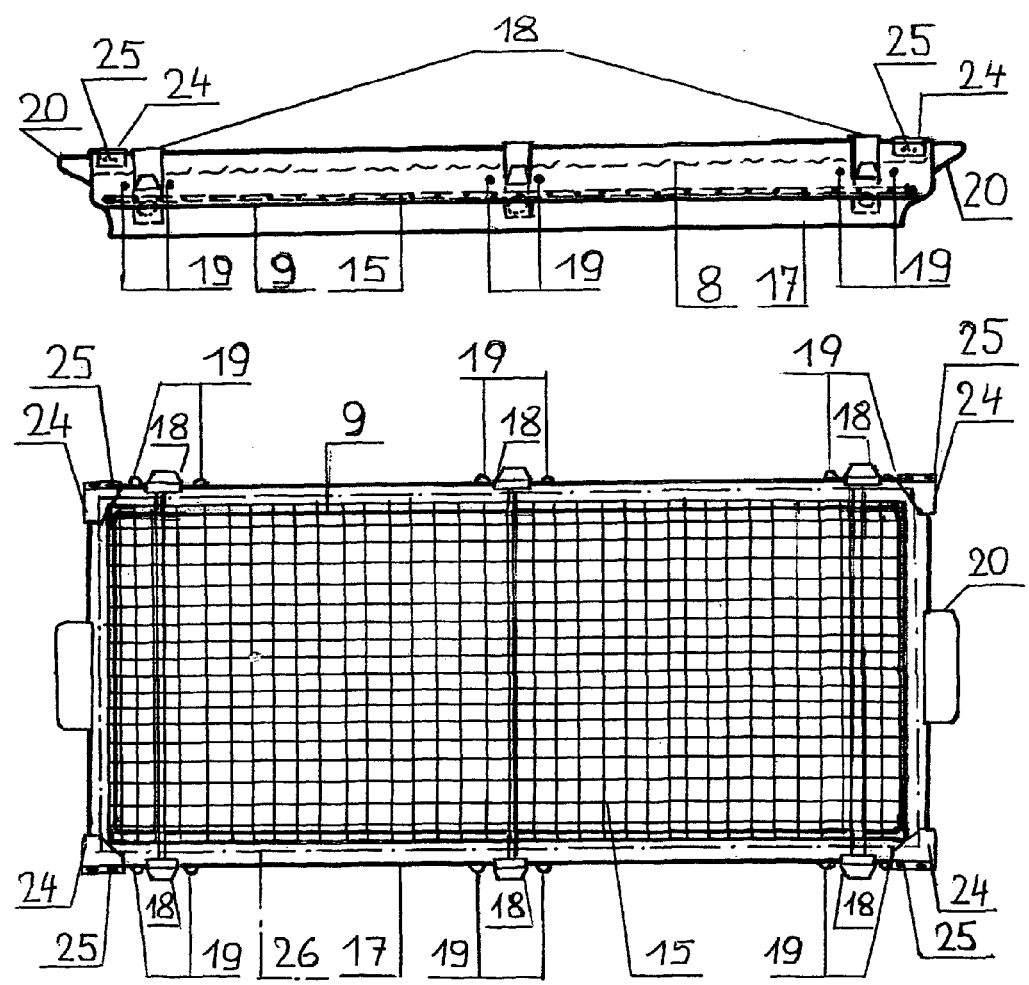
Figure 7:
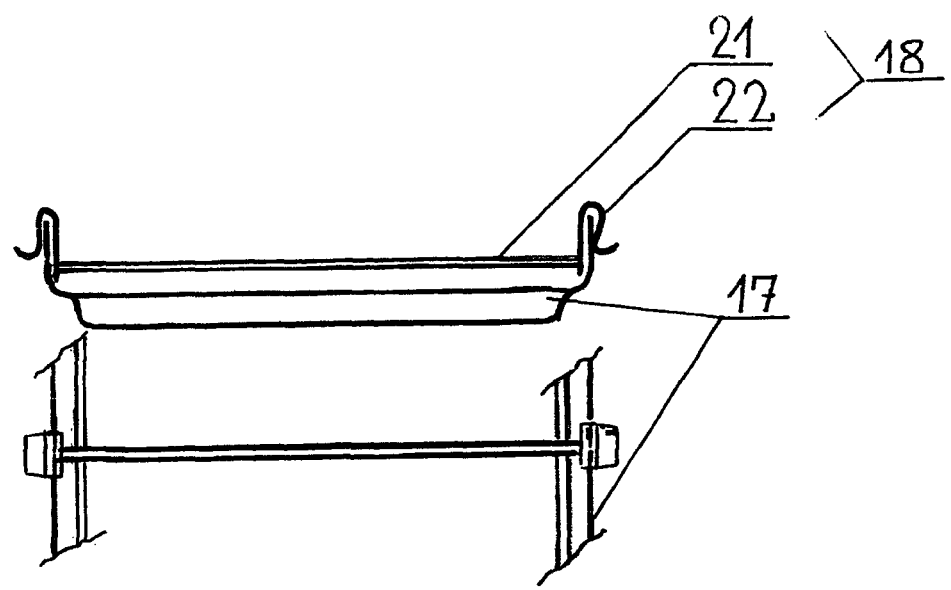
Figure 8:
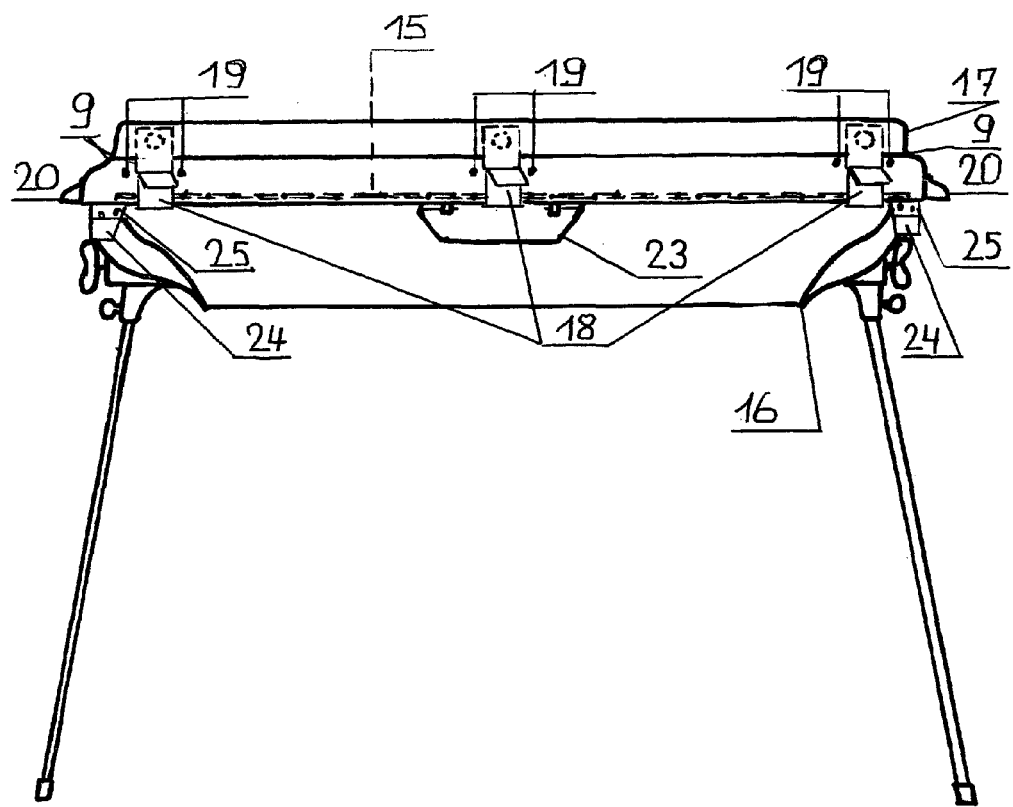
Figure 9:
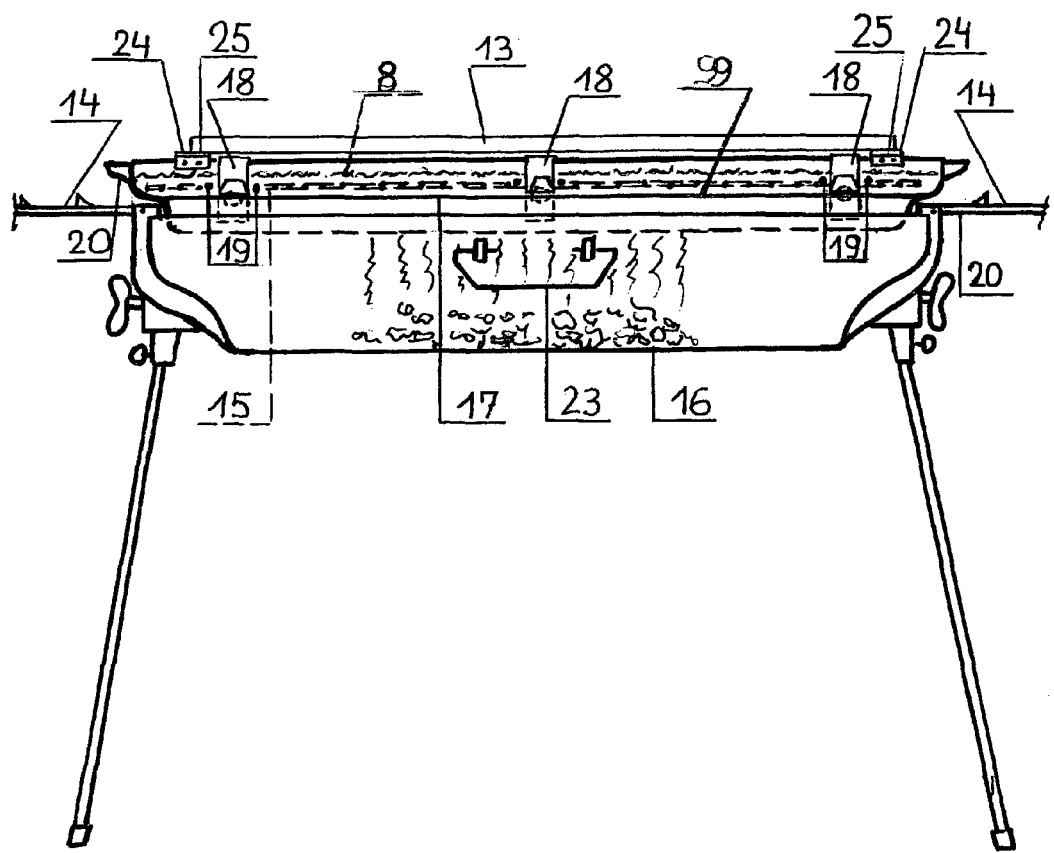

The drawing (FIG. 6) shows the subject matter of the invention by way of example. FIG. 6 shows a rectangular cleaning basin (17) with two handles (20). When placed in the cleaning basin (17), the grate (15) to be cleaned rests on three supports (18) for the grate which are evenly distributed by the positioning pins (19) and are supported against lateral slipping. The supports for the grate (18) ensure that the grate (15) is evenly covered by the water filling (8). The four corner supports (24) with hinges (25) which can be folded about 180° are used as supports for the cover. The drawing (FIG. 7) shows the subject matter of the invention by way of example. FIG. 7 shows a support for the grate (18), consisting of a round bar (21) and a spring clip (22) attached laterally thereto. They are placed laterally above the cleaning basin (17).

1 Upper part of grill=cover
2 Handles of cleaning basin
3 Cleaning basin
4 Grate=(inserted for soaking)
5 Charcoal grate
6 Grill handle
7 Handle of grate 8 Water filling
9 Pressed edge=(for support of grate)
10 Four feet
11 Pressed oval depression
12 Hinges for handles of cleaning basin
13 Removable bent windbreaker
14 Upwardly foldable sides for receiving grate
15 Grate
16 Charcoal basin
17 Cleaning basin
18 Supports for grate
19 Positioning pins for grate
20 Handle of grill basin
21 Round bar
22 Spring clip
23 Handle of charcoal basin
24 Corner support for placement of removable windbreaker or cover plate
25 Hinge for corner support
26 Positioning line for removable windbreaker

The invention claimed is:

1. In combination with a barbecue grill having a cooking grate and a lid for closing the barbecue grill, an apparatus for cleaning the cooking grate of the barbecue grill, the apparatus comprising:
    a water-filled cleaning basin in the barbecue grill positioned over remaining charcoal embers in the grill;
    said cleaning basin being disposed in the barbecue grill so as not to be displaced upon being brushed horizontally or vertically;
    said cleaning basin being formed with a pressed edge and having a floor with an oval-shaped pressed depression formed therein; and
    said cleaning basin being shaped and dimensioned to fit inside the barbecue grill in an upside-down orientation when the lid of the barbecue grill is closed.

2. The apparatus according to claim 1, wherein the barbecue grill is a kettle barbecue grill with a substantially round cooking grill and wherein said cleaning basin is shaped for placement in the kettle barbecue grill and for receiving the substantially round cooking grill of the kettle barbecue grill.

3. The apparatus according to claim 1, wherein the barbecue grill is a rectangular barbecue grill with a substantially rectangular cooking grill and wherein said cleaning basin is shaped for placement in the rectangular barbecue grill and for receiving the substantially rectangular cooking grill of the barbecue grill.

4. The apparatus according to claim 1, wherein the barbecue grill is a kettle barbecue grill with a grate, and the apparatus is configured for cleaning the grate of the kettle grill, wherein said pressed edge of said cleaning basin is formed to support the grate resting on said pressed edge.

5. The apparatus according to claim 1, wherein the barbecue grill is a rectangular grill with a rectangular grate, and the apparatus is configured for cleaning the grate of the rectangular grill, wherein the grate rests on removable supports in said cleaning basin.

6. The apparatus according to claim 1, wherein said cleaning basin is configured to form a grill cover of the barbecue grill.

7. A barbecue grill assembly, comprising:
    a barbecue grill having a cooking grate and a floor for supporting charcoal and, following a cooking process, remaining charcoal embers, an apparatus for cleaning said cooking grate of said barbecue grill,
    said apparatus for cleaning said barbecue grill including:
    a cleaning basin to be filled with water and configured to be positioned in said barbecue grill over remaining charcoal embers in the grill;
    said cleaning basin and the barbecue grill being braced relative to one another so that said cleaning basin is not displaced upon being brushed horizontally or vertically; and
    said cleaning basin being formed with a pressed edge configured and dimensioned to support the cooking grate immersed in water when said cleaning basin is filled with water and said cleaning basin having a floor with an oval-shaped pressed depression formed therein.

8. The apparatus according to claim 7, wherein said barbecue grill is a kettle barbecue grill and said cleaning basin is shaped for placement in said kettle barbecue grill and for receiving a substantially round cooking grill of the kettle barbecue grill.

9. The apparatus according to claim 7, wherein said barbecue grill is a rectangular barbecue grill and said cleaning basin is shaped for placement in said rectangular barbecue grill and for receiving a substantially rectangular cooking grill of said barbecue grill.

* * * * *